(12) United States Patent
Li et al.

(10) Patent No.: US 8,788,904 B2
(45) Date of Patent: Jul. 22, 2014

(54) METHODS AND APPARATUS TO PERFORM ERROR DETECTION AND CORRECTION

(75) Inventors: Sheng Li, Mishawaka, IN (US); Norman Paul Jouppi, Palo Alto, CA (US); Naveen Muralimanohar, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 130 days.

(21) Appl. No.: 13/285,742

(22) Filed: Oct. 31, 2011

(65) Prior Publication Data
US 2013/0111295 A1 May 2, 2013

(51) Int. Cl.
*H03M 13/00* (2006.01)
(52) U.S. Cl.
USPC .......................................................... 714/755
(58) Field of Classification Search
None
See application file for complete search history.

(56) References Cited

U.S. PATENT DOCUMENTS

| | | | | |
|---|---|---|---|---|
| 5,475,693 | A * | 12/1995 | Christopherson et al. | 714/710 |
| 6,024,486 | A * | 2/2000 | Olarig et al. | 714/763 |
| 6,101,614 | A * | 8/2000 | Gonzales et al. | 714/6.1 |
| 7,739,576 | B2 * | 6/2010 | Radke | 714/758 |
| 2008/0072120 | A1 * | 3/2008 | Radke | 714/768 |
| 2008/0077973 | A1 * | 3/2008 | Zimmer et al. | 726/2 |
| 2011/0289380 | A1 * | 11/2011 | Wilkerson et al. | 714/763 |

OTHER PUBLICATIONS

Wilkerson et al., "Reducing Cache Power with Low-Cost, Multi-bit Error-Correcting Codes," ISCA'10, Jun. 19-23, 2010, Saint Malo, France, 11 pages.
Petr Konecny, "Introducing the Cray XMT," Cray Inc., May 5, 2007, 5 pages.
Li et al., "Lightweight Chip Multi-Threading (LCMT): Maximizing Fine-Grained Parallelism On-Chip," IEEE Transactions on Parallel and Distributed Systems, Sep. 28, 2010, 14 pages.
Zhu et al., "Synchronization State Buffer: Supporting Efficient Fine-Grain Synchronization on Many-Core Architectures," ISCA'07, Jun. 9-13, 2007, San Diego, California, 11 pages.
Alverson et al., "The Tera Computer System," ACM, New York, NY, 1990, 6 pages.

* cited by examiner

*Primary Examiner* — Albert Decady
*Assistant Examiner* — Enamul M Kabir

(57) ABSTRACT

Example methods, apparatus, and articles of manufacture to perform error detection and correction are disclosed. A disclosed example method involves enabling a memory controller to operate in one of a tagged memory mode or a non-tagged memory mode. In addition, when the tagged memory mode is enabled in the memory controller, a five-error-correction-six-error-detection per-burst mode is selected to perform error correction on data. When the non-tagged memory mode is enabled in the memory controller, one of a six-error-correction-seven-error-detection per-burst mode or a single-error-correction-dual-error-detection per-transfer mode is selected based on a pattern of error types in the data.

12 Claims, 9 Drawing Sheets

METHODS AND APPARATUS TO PERFORM ERROR DETECTION AND CORRECTION

BACKGROUND

Main memory is one of the most vulnerable hardware components in computing systems. In existing terascale systems, hardware errors account for up to 60% of the total failures. Of this, 40% of the hardware failures are memory related. Memory related failures are likely to increase in future systems not only because of the explosive increase in memory capacity for such future systems, but also because of the adoption of new technologies such as 3D stacking, larger device density, and lower voltage.

Memory reliability is even more complex for systems that use tagged memory. Tagged memory adds an extension bit or bits to each memory word to describe its state. Tagged memory is especially effective for graph-oriented problems that involve intensive communication and synchronization between data items as well as irregular thread and memory behavior. Such graph-oriented problems may include, for example, applications to model, analyze, and/or study interactions between proteins in the human body, linked information on the Internet, and/or intelligence data about the communications and movements of potential adversaries.

DETAILED DESCRIPTION

Figure 1:
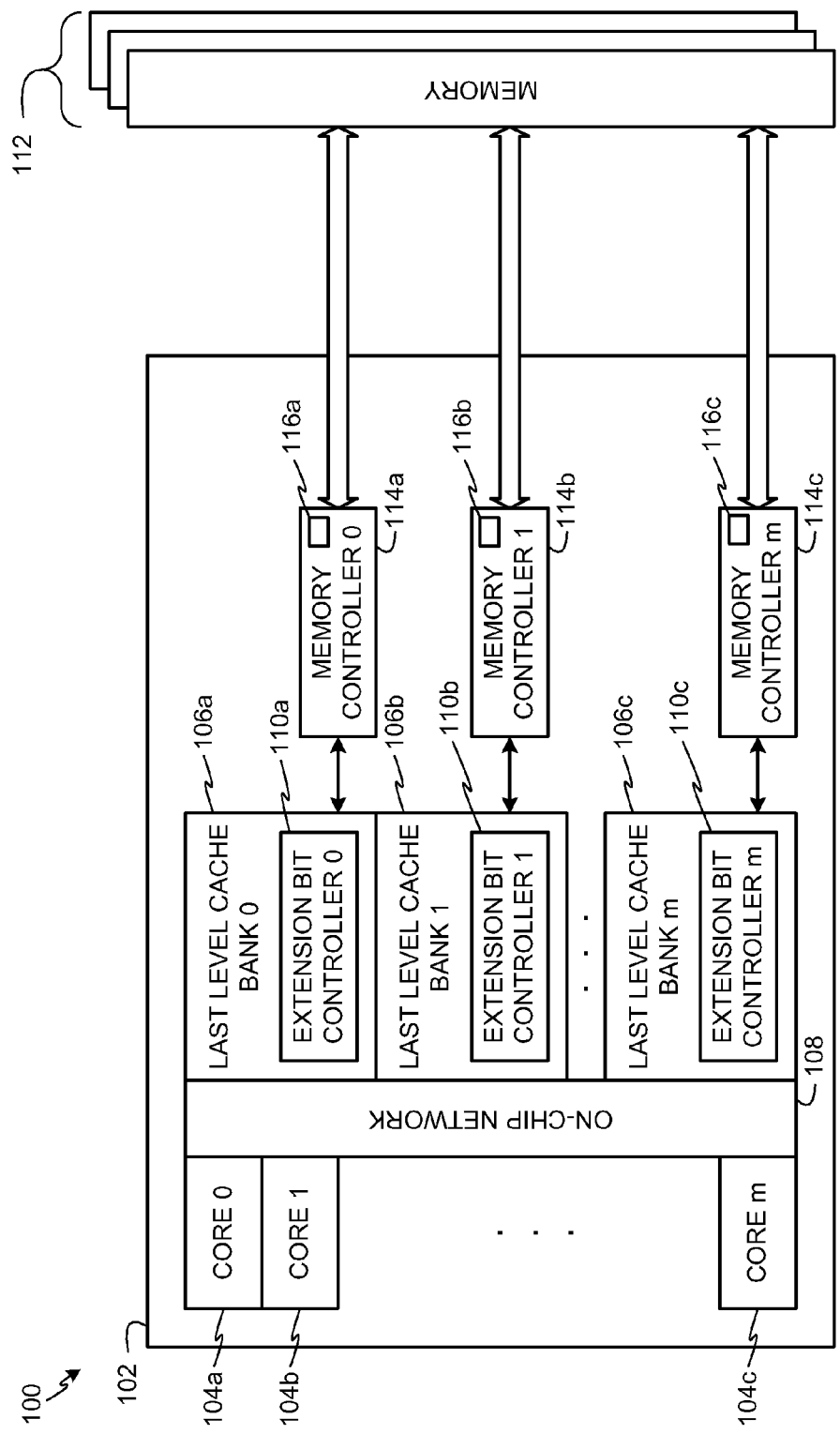
FIG. 1 illustrates an example processor system that can be used to execute example instructions of FIGS. 6A-6C and 7 to perform error detection and correction in accordance with example techniques disclosed herein.

Example methods, apparatus, and articles of manufacture disclosed herein may be used to perform error detection and correction for tagged and non-tagged data storage techniques. Examples disclosed herein are useful in memory subsystems in which error detection and correction is performed. Some examples disclosed herein may be used in connection with graph-oriented databases. Graph-oriented databases and analyses of data stored therein are becoming significantly prevalent in large-scale datacenters. For example, interactions between proteins in the human body, linked information on the Internet, and intelligence data about the communications and movements of potential adversaries are all examples of data sets that have been represented graphically. Representing such information graphically enables revealing relationship patterns between large groups of data items, which is sometimes as useful as the stored data items themselves. Graph-oriented databases and analyses involve intensive communications and synchronizations between stored data items. In known data storage and error detection and correction techniques, scalability is a problem for graph-oriented databases and analyses, and such scalability issues have prevented the broad-market acceptance of such graph-oriented databases. This is because in known data storage systems, the granularity of parallelism that can be efficiently exploited is often limited by the lack of effective architectural support for efficient fine-grained parallelism. As a result, prior applications based on data storage techniques are often characterized by poor performance and poor scalability on current servers and datacenters.

Some example techniques disclosed herein are advantageously useful in implementing tagged memory subsystems to provide improved performance such as for graph-oriented databases and analyses and/or any other purpose. Some such examples disclosed herein implement tagged main memory that supports memory-word-level fine-grained synchronization, while still using commodity (e.g., off-the shelf) memory devices (e.g., dual in-line memory modules (DIMMs), dynamic random access memory (DRAM) devices, etc.).

Examples disclosed herein provide fast and relatively better system reliability than known data storage techniques by using adaptive error correction schemes and smart memory controllers. As a result, examples disclosed herein provide significant scalability improvements over known data storage techniques, for example, when running graph-oriented databases and analyses without increasing system manufacturing costs. This benefits both the database industry and high-performance computing community.

To provide good scalability for graph-oriented databases and analyses, systems with tagged main memory are used to support fine-grained parallelism. In 64-bit systems with tagged main memory, the fundamental storage unit is the extended double word or Xdword. It includes a 64-bit double word (dword) (i.e., eight bytes) together with a 65th bit called an extension bit. (In some instances, two extension bits for each 64-bit double word are used.) When the extension bit value is one (1), the memory word associated with the extension bit is full, and the 64-bit data field contains valid data. When the extension bit value is zero (0), the memory word stored in the 64-bit data field is in an exception state, and the 64-bit data field contains metadata that encodes the states of the data and information used to transition the data state. In this manner, the tagged memory allows memory operations to execute conditionally, depending on the state of the memory they are attempting to access. When a memory operation cannot execute because a data location being accessed is not in the correct state, the thread issuing that memory operation is blocked until the state of the memory location is met. Thus, with tagged memory sub-systems, synchronization can be performed at granularities as small as a single memory word.

However, known memory systems with tagged main memory are complicated and costly. As such, known tagged memory systems have not achieved broad acceptance. In particular, the extension bit(s) for each memory word of these known systems utilize extra memory space for storing data and memory traffic for retrieving data, which leads to higher manufacturing costs and operational costs (e.g., higher system power consumption). In addition, known tagged main memory may need to use customized memory devices (e.g., DIMMs, DRAM chips, etc.), which further increases system costs.

Unlike traditional techniques used to implement error detection and correction of data, example methods, apparatus, and/or articles of manufacture disclosed herein may be advantageously used to implement error detection and correction techniques for tagged and/or non-tagged data storage schemes using commodity (e.g., off-the-shelf) memory devices without needing hardware architectural changes to such memory devices. As a result, examples disclosed herein are relatively less costly to implement and provide better error protection than known techniques for use with existing memory subsystems and datacenters.

Examples disclosed herein also enable implementing memory controllers that are adaptively settable to operate in a tagged memory mode or a non-tagged memory mode (e.g., normal or conventional memory mode) based on a setting in a system memory mode register in the memory controller. In addition, when operating in the non-tagged memory mode, examples disclosed herein enable the memory controller to analyze previously logged error types to detect patterns in types of errors that have occurred. Based on such analyses, the memory controller can dynamically and adaptively select the type of error detection and correction to employ. In this manner, system performance can be improved by switching to a less complex (e.g., less time-consuming or less latency-imposing) error detection and correction process at appropriate times.

Some example methods disclosed herein perform error detection and correction in a memory controller that can be selectively set to operate in a tagged memory mode and selectively set to operate in a non-tagged memory mode. In some examples, a memory controller is enabled to dynamically select whether to operate in the tagged memory mode or the non-tagged memory mode. When the tagged memory mode is dynamically enabled in the memory controller, a five-error-correction-six-error-detection (5EC6ED) per-burst mode capable of correcting five errors in a 64-byte cache line is selected to perform error correction on data. When the non-tagged memory mode is dynamically enabled in the memory controller, a six-error-correction-seven-error-detection (6EC7ED) per-burst mode capable of correcting six errors in a 64-byte cache line, or a single-error-correction-dual-error-detection (SECDED) per-transfer mode capable of correcting one bit error for every 64-bit transfer, a single symbol error correction and double symbol error detection (SSCDSD) mode capable of correcting a single symbol (which is typically four bits for a x4 device) for every transfer (which is typically 128 bits), or a chipkill mode capable of correcting a complete chip failure is selected based on a pattern of error types in the data. In some examples, a symbol is a set of bits, and the quantity of bits in the set of bits in some examples is the same as the output width of a DRAM chip. In some disclosed examples, the memory controller is enabled to operate in the tagged memory mode or the non-tagged memory mode based on a setting in a system mode register of the memory controller.

In some examples, when the tagged memory mode is enabled in the memory controller, the memory controller uses a first portion of bits reserved for an error correction code to store the extension bits for a tagged memory word, and the memory controller uses a second portion of the bits reserved for the error correction code to store the error correction code as described below in connection with FIG. 4. In some such examples, the first portion of the bits reserved for the error correction code includes eight bits, and the second portion of the bits reserved for the error correction code includes fifty-one bits. Some example methods implemented in connection with 64-byte extended double words (Xdwords) further involve, when the tagged memory mode is enabled in the memory controller, retrieving sixty-four (64) bytes of data, fifty-one (51) bits of an error correction code (ECC), and eight (8) extension bits corresponding to a tagged Xdword from a memory into the memory controller within a single read cycle. Some examples disclosed herein enable handling tagged memory, ECC codes, and/or data without incurring additional read and/or write latency penalties when accessing memory locations storing such information.

In some examples, when the tagged memory mode is enabled in the memory controller, a fast error correction code process (fast-ECC), a slow error correction code process (slow-ECC), or a slowest but more robust error correction code (slowest-ECC) process can be used to correct one or more error(s) in data and/or extension bits. For example, when the memory controller detects one error in data and/or extension bits, the example memory controller uses the fast error correction code process to correct the error. When the example memory controller detects more than one error in the data and/or the extension bits, the memory uses a slow error correction code process to correct the errors. When the example memory controller detects more than three errors in the data and/or the extension bits, the example memory controller uses the slowest error correction code process to correct the errors.

Some disclosed example apparatus to perform error detection and correction include a tagged mode selector and an error correction mode selector. In some examples, the tagged mode selector is to dynamically enable a memory controller to operate in a tagged memory mode. In some examples, the error correction mode selector is to select a fast error correction code process to correct an error when the memory controller detects one error in data or extension bits. In some disclosed examples, the error correction mode selector is to select a slow error correction code process to correct errors when the memory controller detects more than one error (e.g., two or three errors) in the data and/or the extension bits. In some disclosed examples, the error correction mode selector is to select a slowest error correction code process to correct errors when the memory controller detects a higher number of errors (e.g., more than three errors) in the data and/or the extension bits.

In some disclosed examples, the error correction mode selector is to select a five-error-correction-six-error-detection per-burst mode to perform error correction on the data and/or the extension bits. In some disclosed examples, the error correction mode selector is to select a six-error-correction-seven-error-detection (6EC7ED) per-burst mode, a single-error-correction-dual-error-detection (SECDED) per-transfer mode, a single symbol error correction and double symbol error detection (SSCDSD) mode, or a chipkill mode based on error types in the data when the tagged mode selector enables a non-tagged memory mode in the memory controller.

Some disclosed example apparatus further include a system memory mode register to indicate whether to set the memory controller to operate in the tagged memory mode or a non-tagged memory mode. Some disclosed example apparatus further include Bose-Chadhuri-Hocquenghem (BCH) logic to perform a fast error correction code process, a slow error correction code process, or the slowest error correction code process.

FIG. 1 illustrates an example processor system 100 and apparatus 116a-c that can be used to execute the example instructions of FIGS. 6A-6C and 7 to perform error detection and correction in accordance with the teachings of this disclosure. The processor system 100 of the illustrated example may be used to implement computing systems, including, for example, exascale datacenters and/or supercomputers. The example processor system 100 of FIG. 1 has a multi-core processor 102 including multiple cores 104a-c in communication with respective last level cache banks 106a-c via an on-chip network 108. To operate in a tagged memory mode, each of the last level cache banks 106a-c includes a respective extension bit controller 110a-c. In the illustrated example, to access (e.g., read and/or write) data in one or more memory device(s) 112, each of the last level cache banks 106a-c is in communication with a respective memory controller 114a-c shown implemented in the multi-core processor 102.

In the illustrated example, the last level cache banks 106a-c locally cache frequently accessed data in the multi-core processor 102 for retrieval by threads executed by the cores 104a-c. When data requested by a thread is not available in the last level cache banks 106a-c and/or when a thread requests that data be written to the memory 112, the memory controllers 114a-c access memory locations in the memory 112 to accomplish such data reads and/or writes.

Figure 2:
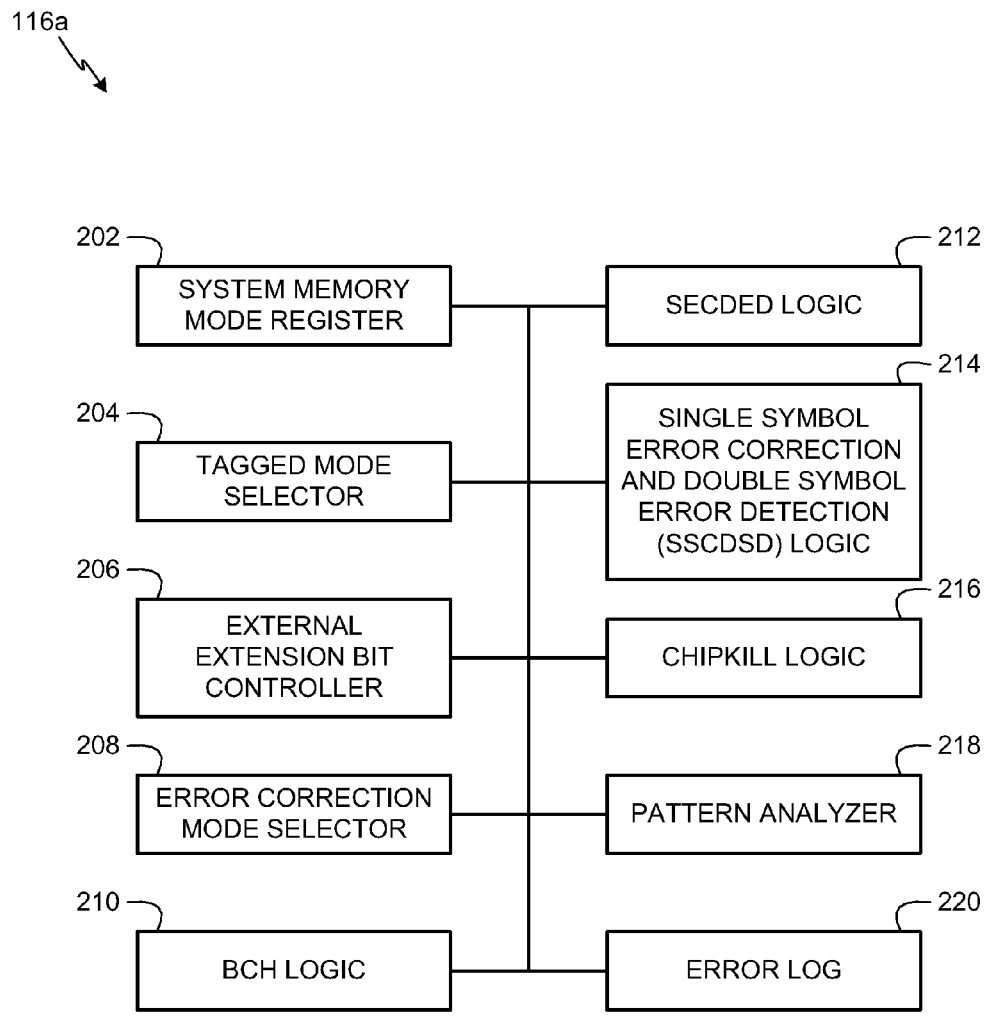
FIG. 2 is a block diagram illustrating any of the example apparatus 116a, 116b, 116c of FIG. 1 that may be used to perform error detection and correction in accordance with example techniques disclosed herein.

In the illustrated example of FIG. 1, the memory controllers 114a-c are provided with respective apparatus 116a-c to control whether the memory controllers 114a-c operate in a tagged memory mode or a non-tagged memory mode, to dynamically determine and select error correction modes to use when in the tagged memory mode, and/or to dynamically determine and select error correction modes to use when in the non-tagged memory mode. An example detailed illustration of the apparatus 116a is shown in FIG. 2. The apparatus 116b and 116c of the illustrated example are substantially similar or identical to the apparatus 116a.

In the illustrated example of FIG. 2, the example apparatus 116a, 116b, 116c includes an example system memory mode register 202, an example tagged mode selector 204, an example external extension bit controller 206, an example error correction mode selector 208, example BCH logic 210, example single-error-correction-double-error-detection (SECDED) error logic 212, example single symbol error correction and double symbol error detection (SSCDSD) logic 214, example chipkill logic 216, an example error pattern analyzer 218, and an example error log 220. While an example manner of implementing the apparatus 116a, 116b, 116c has been illustrated in FIG. 2, one or more of the elements, processes and/or devices illustrated in FIG. 2 may be combined, divided, re-arranged, omitted, eliminated and/or implemented in any other way. Further, the system memory mode register 202, the tagged mode selector 204, the external extension bit controller 206, the error correction mode selector 208, the BCH logic 210, the SECDED logic 212, the example SSCDSD logic 214, the example chipkill logic 216, the error pattern analyzer 218, the error log 220, and/or, more generally, the example apparatus 116a, 116b, 116c of FIG. 2 may be implemented by hardware, software, firmware and/or any combination of hardware, software and/or firmware. Thus, for example, any of the system memory mode register 202, the tagged mode selector 204, the external extension bit controller 206, the error correction mode selector 208, the BCH logic 210, the SECDED logic 212, the example SSCDSD logic 214, the example chipkill logic 216, the error pattern analyzer 218, the error log 220, and/or, more generally, the example apparatus 116a, 116b, 116c could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus and/or system claims are read to cover a purely software and/or firmware implementation, at least one of the system memory mode register 202, the tagged mode selector 204, the external extension bit controller 206, the error correction mode selector 208, the BCH logic 210, the SECDED logic 212, the example SSCDSD logic 214, the example chipkill logic 216, the error pattern analyzer 218, and/or the error log 220 is hereby expressly defined to include a tangible computer readable medium such as a memory, DVD, CD, etc. storing the software and/or firmware. Further still, the example apparatus 116a, 116b, 116c illustrated in FIG. 2 may include one or more elements, processes and/or devices in addition to, or instead of, those illustrated in FIG. 2, and/or may include more than one of any or all of the illustrated elements, processes and devices.

To store settings indicative of whether the corresponding memory controller (e.g., 114a, 114b, 114c) is to operate in a non-tagged memory mode (e.g., a normal or conventional memory mode) or a tagged memory mode, the apparatus 116a, 116b, 116c of the illustrated example is provided with the system memory mode register 202. In the illustrated example, the system memory mode register 202 stores a bit value or bit values to indicate a tagged memory mode and stores another bit value or other bit values to indicate a non-tagged memory mode.

To determine whether the system memory mode register 202 indicates a tagged memory mode or a non-tagged memory mode and to configure the corresponding memory controller (e.g., 114a, 114b, 114c) to operate in the tagged memory mode or the non-tagged memory mode, the apparatus 116a, 116b, 116c of the illustrated example is provided with the tagged mode selector 204. In some examples, during power up or initialization of the memory controller (e.g., 114a, 114b, 114c), the tagged mode selector 204 retrieves the contents of the system memory mode register 202 to determine whether the contents of the system memory mode register 202 indicate that the corresponding memory controller (e.g., 114a, 114b, 114c) should be configured to operate in a tagged memory mode or a non-tagged memory mode.

To determine states of memory locations being accessed when the memory controller is operating in a tagged memory mode, the apparatus 116a, 116b, 116c of the illustrated example is provided with the external extension bit controller 206. The external extension bit controller 206 enables synchronization of instruction execution at the memory word level by facilitating conditional execution of such instructions. In some examples, such conditional execution is based on the states of memory locations being accessed as indicated by the extension bit values associated with those memory locations. That is, the external extension bit controller 206 can determine when a tagged memory location being accessed is not in the correct state (e.g., the stored data is invalid) based on its extension bits. When a tagged memory location is in an invalid state, a memory operation to access that memory location is stalled and, thus, a thread (e.g., a thread executed by one of the cores 104a-c of FIG. 1) associated with the memory operation is blocked. When the external extension bit controller 206 determines that the extension bits of the memory location indicate that the state of the memory location is restored and valid, the memory operation can proceed and, thus, the corresponding thread is no longer blocked.

To select error correction modes to use for correcting errors, the apparatus 116a, 116b, 116c of the illustrated example is provided with the error correction mode selector 208. In the illustrated example, when the corresponding memory controller (e.g., 114a, 114b, 114c) is in tagged memory mode (e.g., as indicated in the system memory mode register 202), the error correction mode selector 208 selects to use 5EC6ED (5 error correction and 6 error detection) BCH hardware and/or software (e.g., as provided by the BCH logic 210) to protect 520 bits of data, which include 512 bits of memory data and 8 bits of extension bits.

In the illustrated example, when the corresponding memory controller (e.g., 114a, 114b, 114c) is in a non-tagged memory mode (e.g., as indicated in the system memory mode register 202), the error correction mode selector 208 conditionally selects between 6EC7ED (6 error correction and 7 error detection) BCH hardware and/or software (e.g., as provided by the BCH logic 210) and SECDED (single error correction and double error detection) ECC hardware and/or software (e.g., as provided by the SECDED logic 212). For example, when random errors dominate in data retrieved from the memory 112, the error correction mode selector 208 selects the 6EC7ED BCH hardware and/or software (e.g., as provided by the BCH logic 210). As used herein, random errors are errors in which no particularly significant pattern or similarities exist between errors. When re-occurrence errors dominate, the error correction mode selector 208 selects the SECDED ECC hardware and/or software (e.g., as provided by the SECDED logic 212). As used herein, re-occurrence errors are errors in which similarities or patterns of incorrect bits exist between errors (e.g., an error in the same bit location, such as a stuck bit, re-occurs in a repetitive fashion).

To generate BCH error correction codes and detect and correct errors using BCH error correction codes, the apparatus 116a, 116b, 116c of the illustrated example is provided with the BCH logic 210. In the illustrated example, the BCH logic 210 generates BCH codes for data requested to be written to the memory 112 and detects errors in data stored in the memory 112 based on BCH codes stored in association therewith. The BCH logic 210 of the illustrated example implements two or more different types of BCH detection and correction code hardware and/or software including, for example, 5EC6ED BCH hardware and/or software and 6EC7ED BCH hardware and/or software.

To generate SECDED error correction codes, and to detect and correct errors using SECDED error codes, the apparatus 116a, 116b, 116c is provided with the SECDED logic 212. In the illustrated example, the SECDED logic 212 generates SECDED ECC codes for data requested to be written to the memory 112 and detects errors in data stored in the memory 112 based on SECDED ECC codes stored in association therewith. The SECDED logic 212 of the illustrated example implements detection and correction code hardware and/or software.

To generate symbol error correction codes, and to detect and correct errors using symbol error codes, the apparatus 116a, 116b, 116c is provided with the SSCDSD logic 214. In the illustrated example, the SSCDSD logic 214 generates symbol ECC codes for symbol data requested to be written to the memory 112 and detects errors in symbol data stored in the memory 112 based on symbol ECC codes stored in association therewith. In some examples, a symbol is a set of bits. In some examples, the quantity of bits in the set of bits is the same as the output width of a DRAM chip. The SSCDSD logic 214 of the illustrated example implements detection and correction code hardware and/or software.

To generate chipkill error correction codes, and to detect and correct errors using a combination of hamming code and bitsteering and/or using SSCDSD (e.g., using Reed-Solomon error detection and correction techniques), the apparatus 116a, 116b, 116c is provided with the chipkill logic 216. In the illustrated example, the chipkill logic 216 generates chipkill ECC codes for data requested to be written to the memory 112 and detects errors in data stored in the memory 112 based on chipkill ECC codes stored in association therewith. The chipkill logic 216 of the illustrated example implements detection and correction code hardware and/or software To analyze errors, error patterns or dominant types of errors that occur in data retrieved from the memory 112 of FIG. 1, the apparatus 116a, 116b, 116c of the illustrated example is provided with the error pattern analyzer 218. The error pattern analyzer 218 of the illustrated example determines error types in retrieved data and whether dominant errors in the retrieved data are random errors or re-occurrence errors. The error pattern analyzer 218 of the illustrated example stores error types in the error log 220, which may be implemented using a static RAM (SRAM) buffer in the memory controller corresponding to the apparatus (e.g., the memory controller 114a for the apparatus 116a, the memory controller 114b for the apparatus 116b, and the memory controller 114c for the apparatus 116c). In addition, the error pattern analyzer 218 can communicate the results of its analysis to the error correction mode selector 208 to assist the error correction mode selector 208 in selecting which error correction modes to use.

Figure 3:
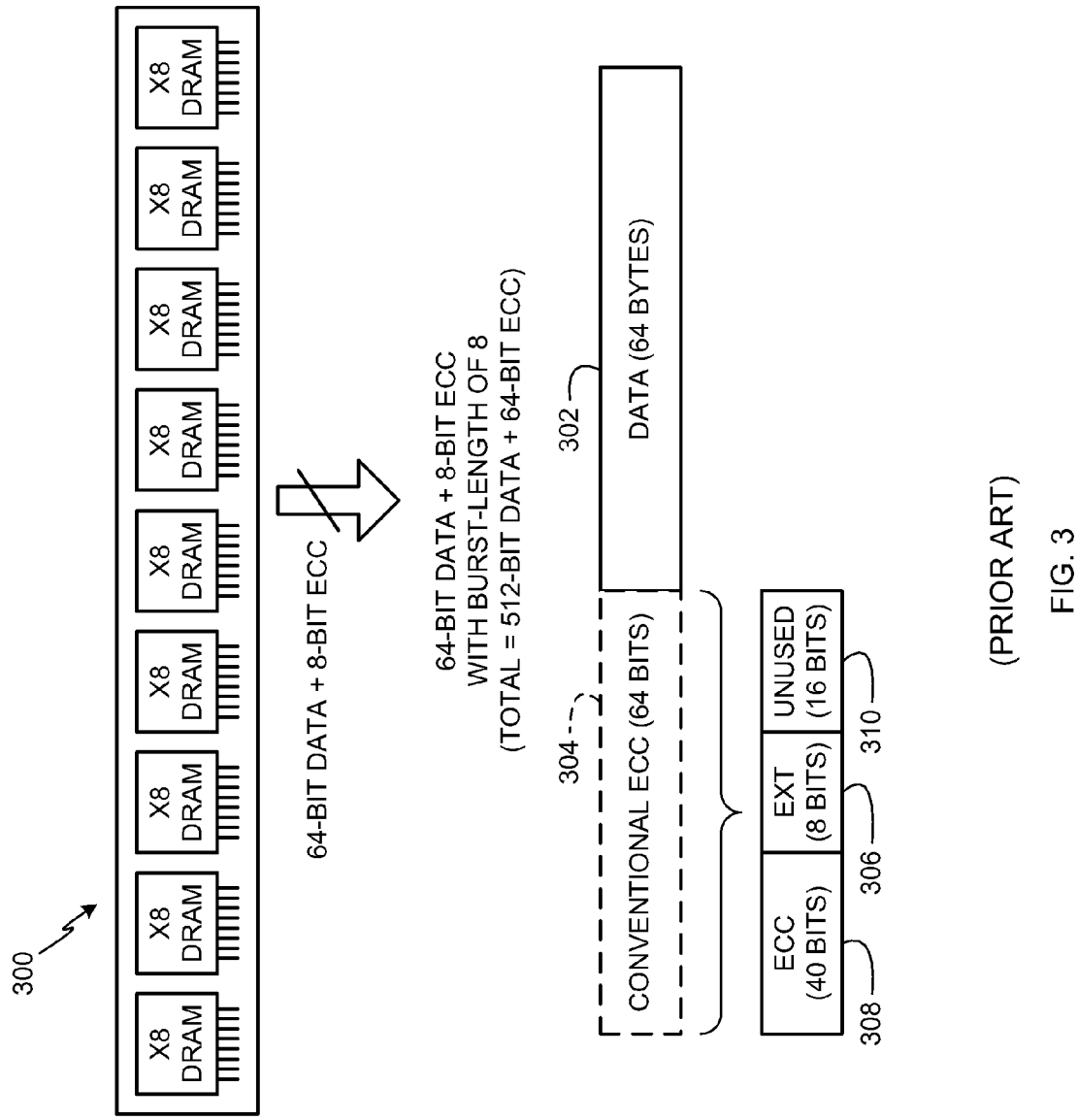
FIG. 3 illustrates a prior art storage arrangement for storing data, error correction code (ECC) bits, and extension bits in connection with a tagged memory subsystem.

FIG. 3 illustrates a prior art storage arrangement for storing data 302, error correction code (ECC) bits 304, and extension bits 306 in connection with a tagged memory subsystem. In a 64-bit tagged memory subsystem, the fundamental storage unit is called an extended double word or Xdword. It includes of a 64-bit double word (dword) together with an extra bit called an extension bit (Xbit). By using the extension bit in tandem with mode fields within the dword, a set of memory states for the dword can be defined. This supports synchronization at the memory word level by allowing memory operations to execute conditionally, depending upon the state of the memory that they are attempting to access. When a memory operation cannot execute because the location being accessed is not in the correct state, the thread responsible for that operation gets blocked. Once the memory state is restored, the thread will continue its execution. Some known processors are provided with capabilities to support tagged memory. However, the extra extension bit per 64-bit double word requires an extra bit cell in memory. As such, custom memories (e.g., custom DRAMs) are employed in which extra bit cells are fabricated to support extension bits.

In the illustrated example of FIG. 3, a memory device 300 is implemented using a DRAM dual inline memory module (DIMM) storing eight Xdwords comprising eight (8) 64-bit dwords stored as 64 bytes of the data 302. In the illustrated example, the memory device 300 includes conventional ECC bit locations 304. The storage arrangement of FIG. 3 stores eight (8) extension bits 306 and stores 40 ECC bits 308 in the ECC bit locations 304. In the illustrated example, the partitioning of the conventional ECC bit locations 304 to store the extension bits 306 and the ECC bits 308 results in 16 unused bits 310. The 16 unused bits 310 are wasted space. Thus, for the storage arrangement of FIG. 3, 25% of the ECC bit locations 304 is wasted, resulting in a relatively inefficient use of the conventional ECC bit locations 304.

A prior art system that implements tagged memory subsystems using conventional commodity DRAM is the Cray XMT system designed and sold by Cray, Inc. of Seattle, Wash., United States of America. The Cray XMT leverages ECC bit fields in a commodity ECC DRAM to store extension bits (e.g., the extension bits 306 of FIG. 3). Specifically, the Cray XMT machine enlarges the ECC protection granularity from 64 bits to 128 bits, resulting in savings of three bits for every 64-bit memory word. The memory controller is then modified to treat the saved bits in the ECC bit fields as extension bits. Unfortunately, increasing the ECC word length from 64 bits to 128 bits results in a 2.25× decrease in the memory system reliability based on Monte Carlo simulations performed by the inventors of the instant application. Further, coarser ECC protection makes it highly unlikely to be able to upgrade to chipkill or double chipkill. With resiliency being a first-order design constraint for Exascale systems, providing error coverage lower than traditional ECC is not feasible for future systems. Thus, the storage arrangement of FIG. 3 results in an inefficient use of the conventional ECC bits space 304 and increasing the ECC word length for 64 bits to 128 bits decreases reliability performance.

Examples disclosed herein for implementing tagged memory subsystems achieve better or more efficient use of conventional ECC bit locations in commodity DRAM DIMM modules and achieve better reliability performance than achievable using techniques of the Cray XMT. FIG. 4 illustrates an example disclosed storage arrangement for storing data 402, extension bits 404, and ECC bits 406 in a memory device 400 (e.g., a non-tag-specific memory such as a commodity DRAM DIMM) to implement a tagged memory subsystem. Although the memory device 400 of the illustrated example is implemented as a DIMM having nine (9) DRAM chips, more or fewer DRAM chips may be used instead. In some examples, the memory device 400 is used to implement the memory 112 of FIG. 1. In the illustrated example of FIG. 4, the memory device 400 includes ECC bit locations 408 ordinarily reserved for error correction codes in which 64 bits of ECCs can be stored. However, instead of using 64 ECC bits as typical for SECDED codes, examples disclosed herein store the extension bits 404 in a first portion of the ECC bit locations 408 and the ECC bits 406 in a second portion of the ECC bit locations 408. In the illustrated example, BCH error codes are used to implement the ECC bits 406 using only 51 ECC bits. Using the disclosed storage arrangement of FIG. 4, the smaller bit-length BCH error correction codes enable storing the extension bits 404 in the ECC bit locations 408 without compromising the reliability of tagged memory systems. The ECC word size in FIG. 4 is selected as the size of a last level cache block (e.g., corresponding to one or more of the last level cache banks 106a-c of FIG. 1), which is 64 bytes for most processors. A 5EC6ED BCH code uses 51 ECC bits to protect every 64-byte data block (e.g., the data 402) and their associated eight extension bits (e.g., the extension bits 404). Therefore, 13 bits of the ECC bit locations 408 can be saved for each cache-line-size data by using the BCH code. In the illustrated example of FIG. 4, the eight extension bits 404 can be stored in eight of these unused 13 bits of the ECC bit locations 408 resulting in only five unused bits 410 instead of the 16 unused bits 310 of FIG. 3. Using the disclosed storage arrangement of FIG. 4, BCH codes can be used to perform error detection and correction on both data bits (e.g., the data 402) and extension bits (e.g., the extension bits 404). The lengthier 51-bit BCH code stored in the ECC bits 406 of FIG. 4 increases reliability performance over the 40-bit ECC codes of FIG. 3 by 2.25×. In addition, the lengthier 51-bit ECC codes of FIG. 4 lead to more efficient use of the ECC bit locations 408 by leaving only the five unused bits 410 rather than the 16 unused bits 310 of FIG. 3, thus reducing the amount of wasted memory bits by 3.2×.

Figure 4:
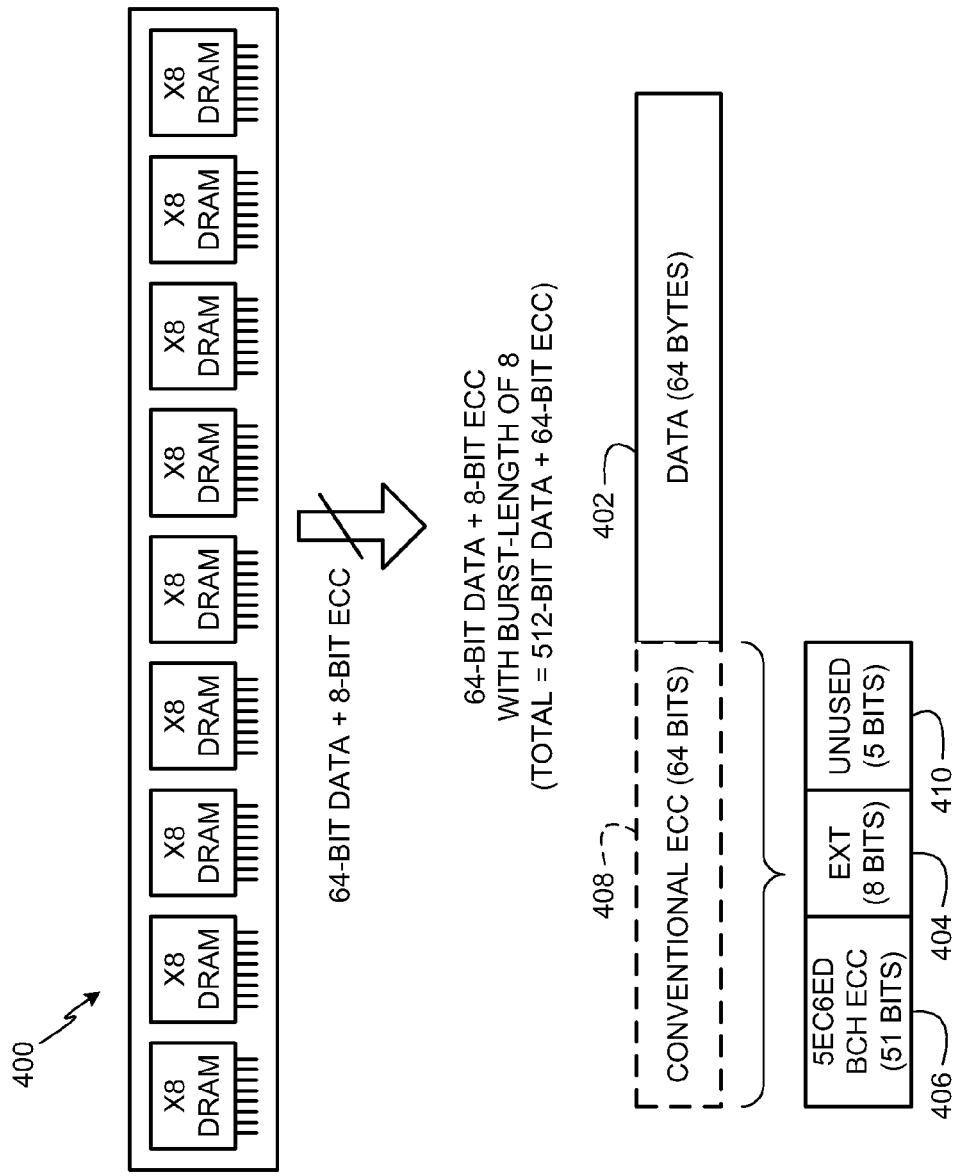
FIG. 4 illustrates an example disclosed storage arrangement for storing data, ECC bits, and extension bits in a conventional commodity memory to implement a tagged memory subsystem.

An access to the DRAM DIMM 400 activates a set of DRAM chips referred to as a rank (e.g., nine (9) x8 DRAM chips shown in FIG. 4). A read or write to a DRAM rank involves a burst of transfers between a memory controller (e.g., one or more of the memory controllers 114a-c of FIG. 1) and the DRAM DIMM 400. For example, a memory request of size 64 bytes from a memory controller to a DRAM DIMM results in eight transfers of 64 bits of data and 8 bits of ECC. This set of data transfers is referred to as a burst. In such a transfer, a burst includes 64 bytes of data and 8 bytes of ECC. Depending upon the type of error correction mode enabled, ECC bits can either correct error(s) in each transfer as it is performed or for the entire burst when all transfers are finished. Error correcting codes such as SECDEC and single symbol correction double symbol detection (SSCDSD) correct a single bit error or a single symbol error for each transfer (e.g., corrections made on a per-transfer basis). However, under the BCH mode, a memory controller waits for all of the ECC bits (e.g., 64 bits or 8 bytes of ECC) to be transferred before correcting errors in the entire 64 bytes of transferred data (e.g., corrections made on a per-burst basis).

Figure 5:
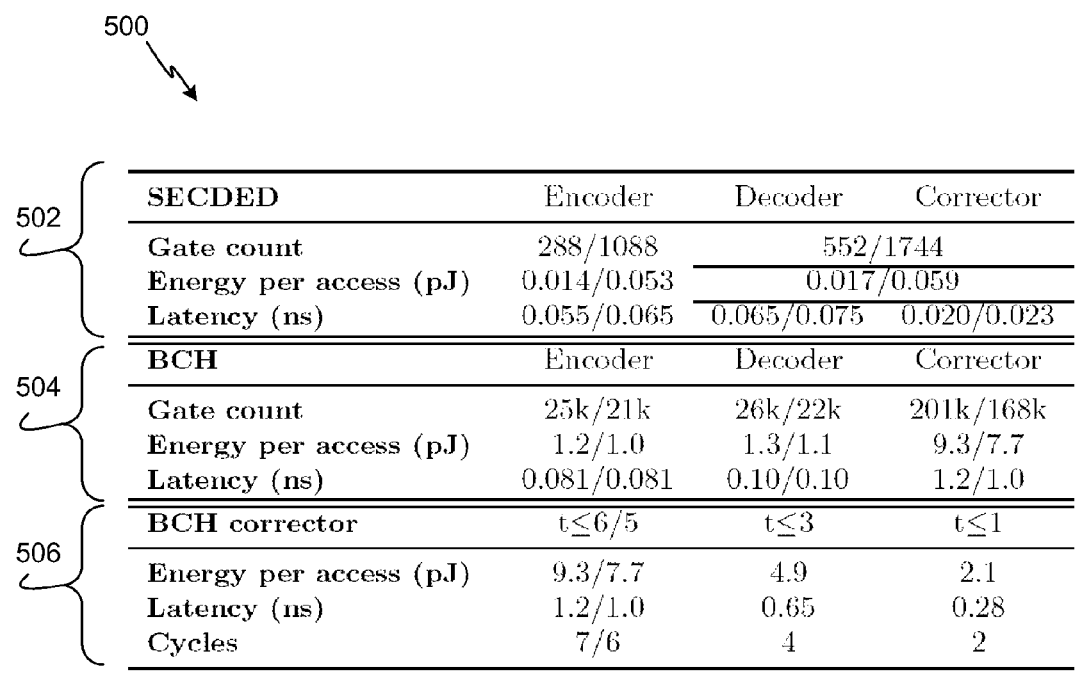
FIG. 5 shows a performance comparison table comparing performance and energy consumption of a memory subsystem using the example disclosed storage arrangement of FIG. 4 with performance and energy consumption of a Cray XMT implementation.

FIG. 5 shows a table 500 comparing performance and energy consumption of a memory subsystem using the example disclosed storage arrangement of FIG. 4 with performance and energy consumption of the Cray XMT implementation. The performance comparison table 500 of FIG. 5 shows that the disclosed example of FIG. 4 achieves 45%, 33%, and 61% improvement on overall system performance, power, and energy-delay, respectively, over the Cray XMT implementation. In the performance comparison table 500, energy per access (EPA) and latency of the SECDED error correction code implementation are indicated by reference numeral 502, EPA and latency of the BCH error correction code implementation are indicated by reference numeral 504, and energy and timing of the staged BCH corrector implementation are indicated by reference numeral 506. An example staged BCH corrector process is described below in connection with FIG. 7. In the illustrated example of FIG. 7, the example staged BCH corrector process is used to dynamically select which type of BCH error correction (e.g., fast-ECC, slow-ECC, or slowest-ECC) to use based on the quantities of errors found in data and/or extension bits.

The performance measures shown in the performance comparison table 500 of the illustrated example of FIG. 5 are associated with a processor fabricated using an 11 nanometer (nm) process. In the example performance comparison table 500, values in left/right pairs stand for 64-bit/128-bit for SECDED and 6EC7ED/5EC6ED for BCH. The 128-bit SECDED and 5EC6ED are used for tagged memory only. For the staged BCH corrector performance 506, the variable (t) denotes the correcting ability of the BCH corrector and 'Cycles' measures correspond a 4 GHz DDR4-4266 channel of a memory controller.

Figure 6A:
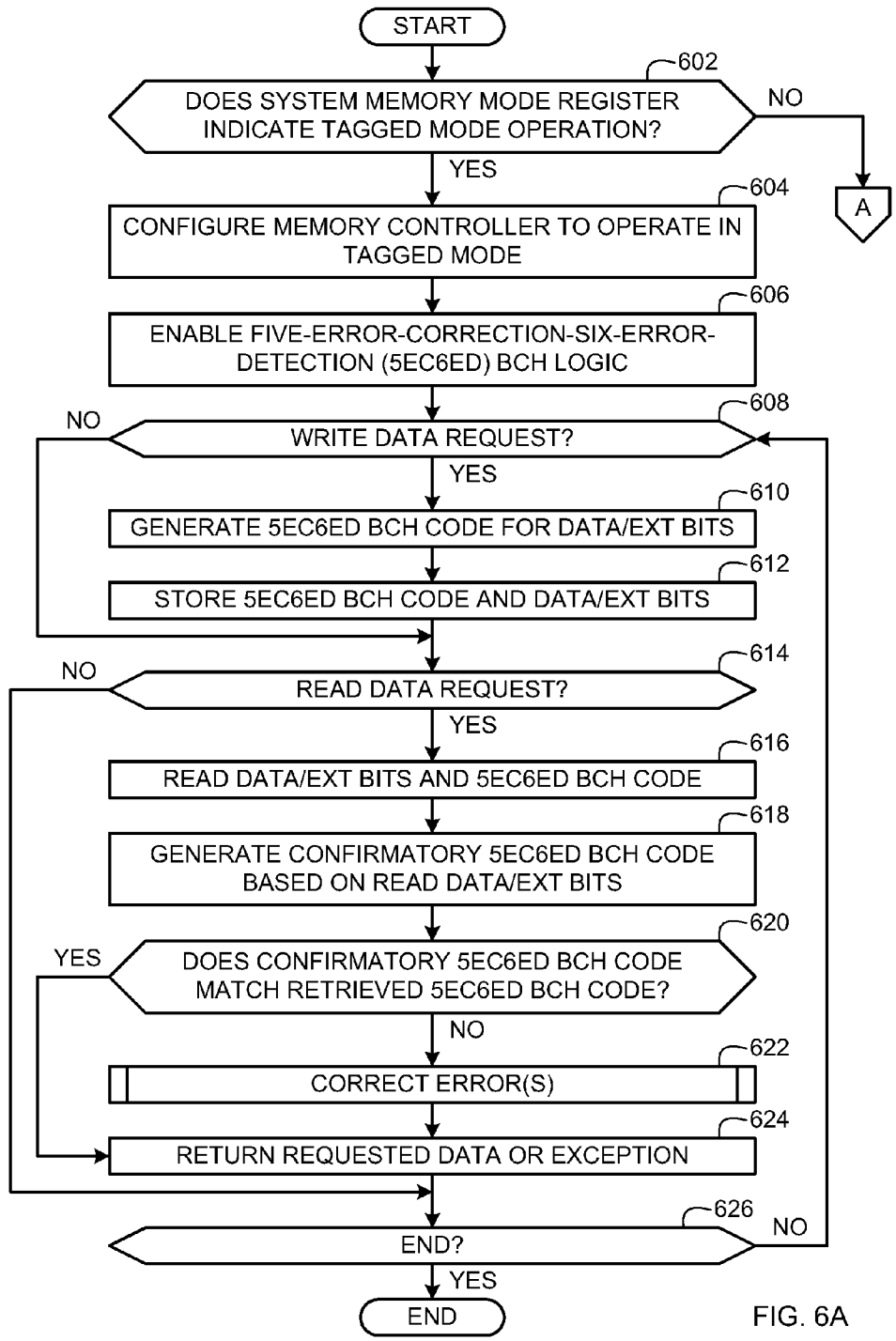
FIGS. 6A-6C are a flow diagram representative of example machine readable instructions to selectively operate a memory controller in one of a tagged memory mode or a non-tagged memory mode and to dynamically determine an error correction mode to use in the tagged memory mode.
Figure 6B:
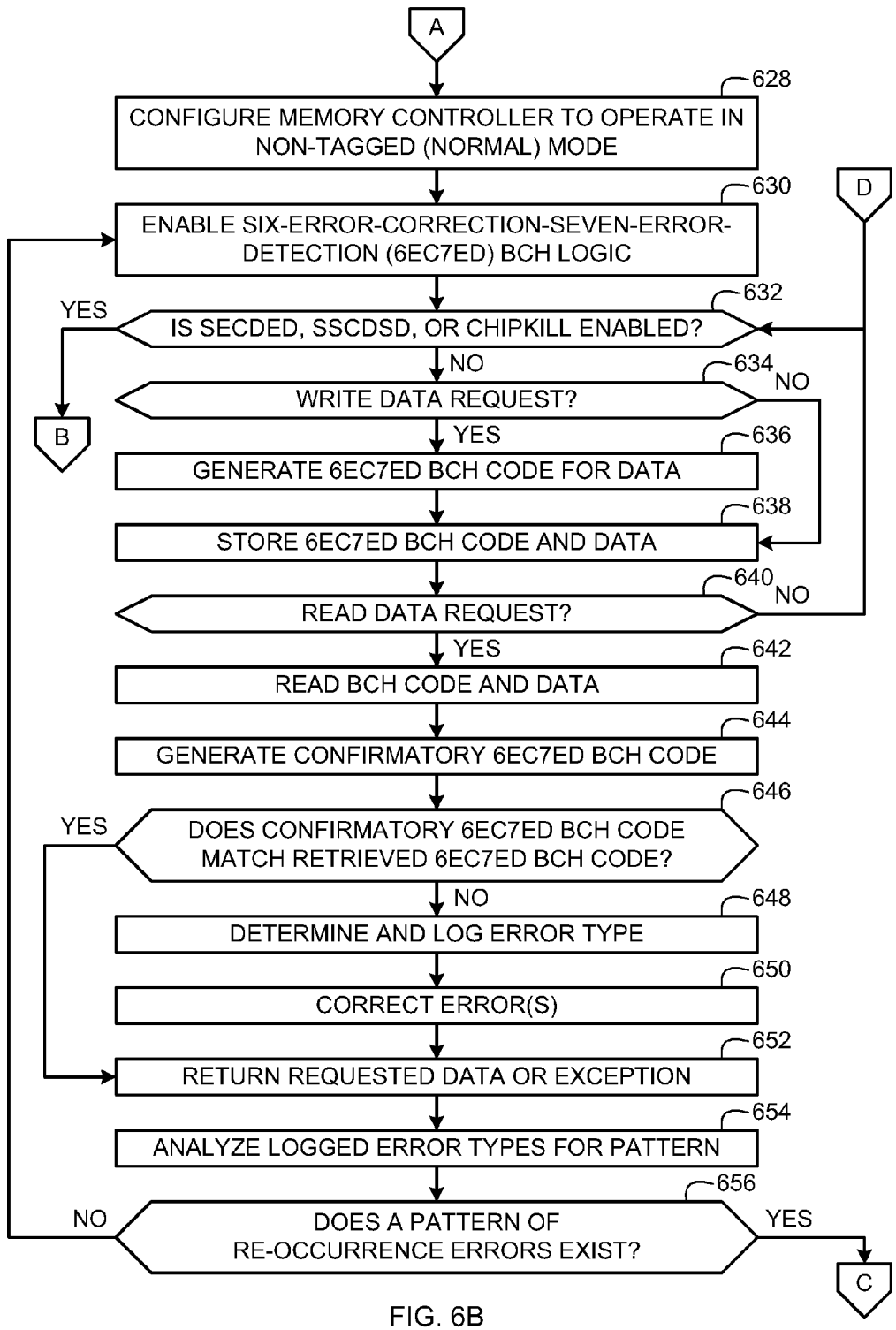
Figure 6C:
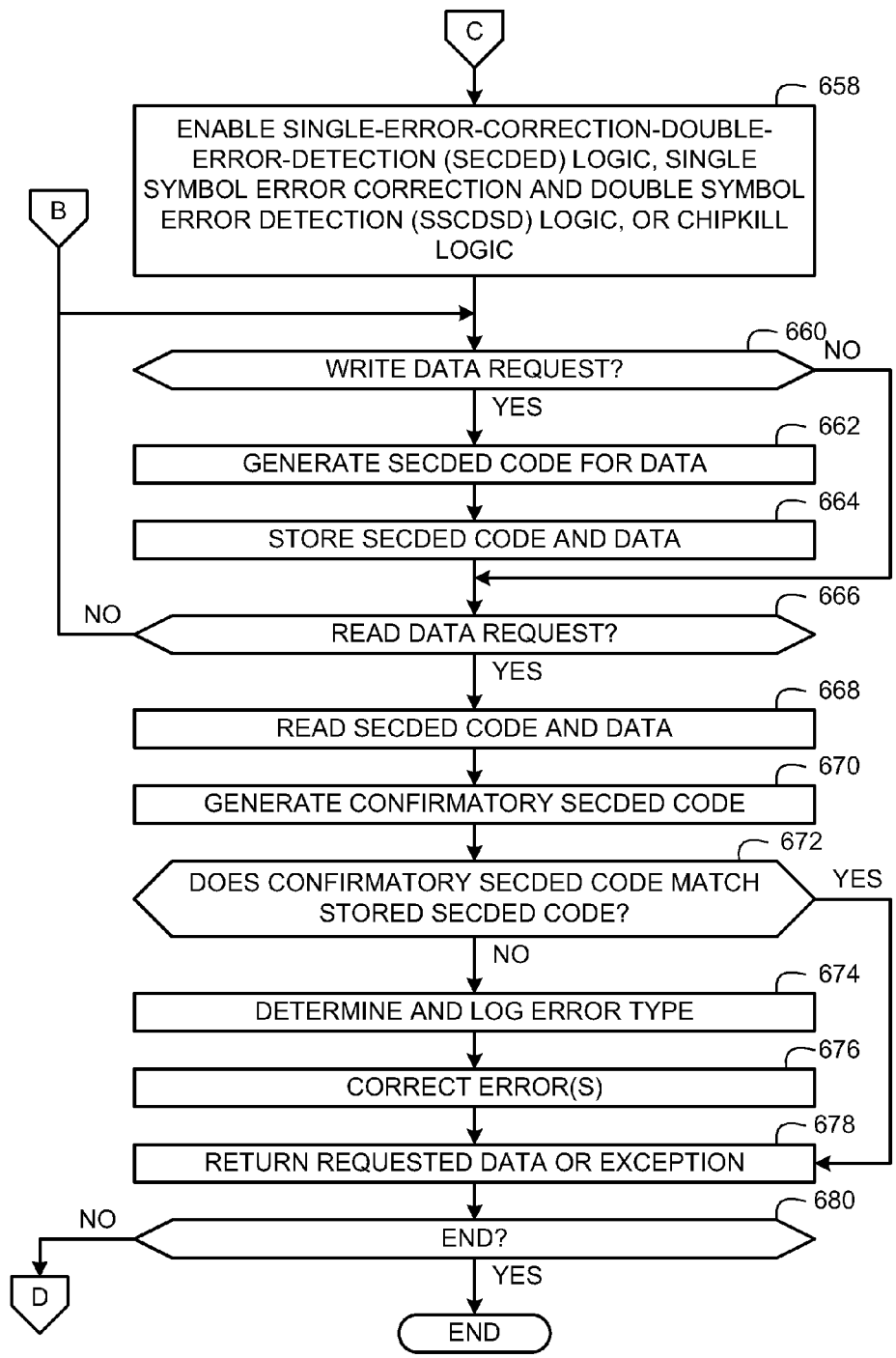
Figure 7:
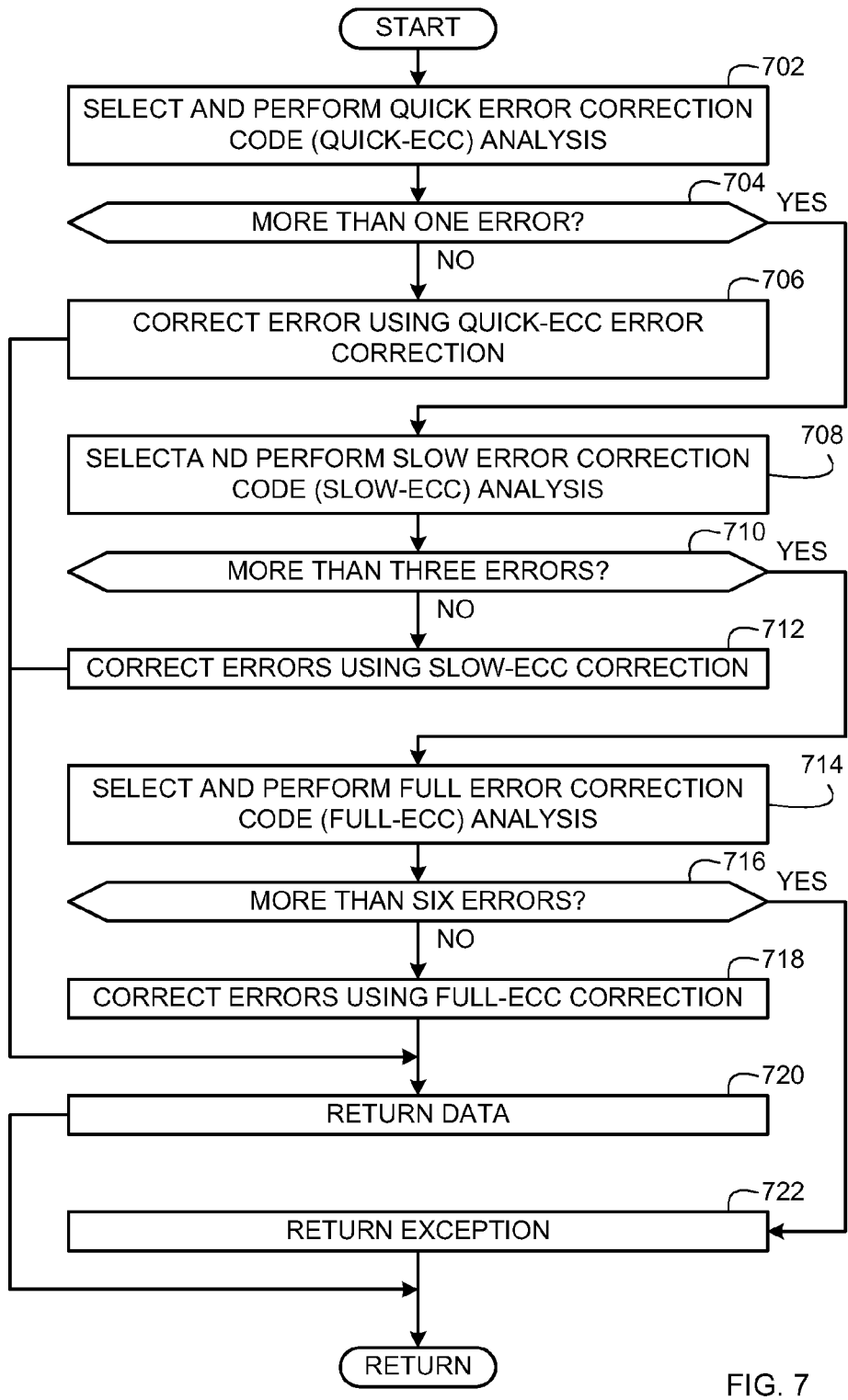
FIG. 7 is a flow diagram representative of example machine readable instructions to dynamically determine an error correction mode to use in a tagged memory mode.

FIGS. 6A-6C are a flow diagram representative of example machine readable instructions to selectively operate a memory controller (e.g., one or more of the memory controllers 114a-c of FIG. 1) in one of a tagged memory mode or a non-tagged memory mode and dynamically determine an error correction mode to use in the tagged memory mode. FIG. 7 is a flow diagram representative of example machine readable instructions to dynamically determine an error correction mode to use in a tagged memory mode. For ease of discussion, the example processes of FIGS. 6A-6C and 7 are described below in connection with the memory controller 114a and the apparatus 116a of FIG. 1. However, the example processes are similarly implemented using the other memory controllers 114b, 114c and/or the apparatus 116b, 116c of FIG. 1.

The example processes of FIGS. 6A-6C and 7 may be implemented using machine readable instructions that, when executed, cause a device (e.g., a programmable controller, processor (e.g., the multi-core processor 102 of FIG. 1), or other programmable machine or integrated circuit) to perform the operations shown in FIGS. 6A-6C and 7. For instance, the example processes of FIGS. 6A-6C and 7 may be performed using a processor, a controller, and/or any other suitable processing device. For example, the example processes of FIGS. 6A-6C and 7 may be implemented using coded instructions stored on a tangible machine readable medium such as a flash memory, a read-only memory (ROM), and/or a random-access memory (RAM).

As used herein, the term tangible computer readable medium is expressly defined to include any type of computer readable storage and to exclude propagating signals. Additionally or alternatively, the example processes of FIGS. 6A-6C and 7 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example processes of FIGS. 6A-6C and 7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 6A-6C and 7 may be implemented as any combination(s) of any of the foregoing techniques, for example, any combination of firmware, software, discrete logic and/or hardware.

Although the example processes of FIGS. 6A-6C and 7 are described with reference to the flow diagrams of FIGS. 6A-6C and 7, other methods of implementing the processes of FIGS. 6A-6C and 7 may be employed. For example, the order of execution of the blocks may be changed, and/or some of the blocks described may be changed, eliminated, sub-divided, or combined. Additionally, one or both of the example processes of FIGS. 6A-6C and 7 may be performed sequentially and/or in parallel by, for example, separate processing threads, processors, devices, discrete logic, circuits, etc.

Turning to FIGS. 6A-6C, initially, the tagged mode selector 204 (FIG. 2) determines whether the system memory mode register 202 (FIG. 2) indicates a tagged mode of operation (block 602). If the system memory mode register 202 does not indicate a tagged mode of operation, control advances to block 628 of FIG. 6B. Otherwise, the tagged mode selector 204 configures the memory controller 114a to operate in a tagged mode (block 604). In addition, the error correction mode selector 208 (FIG. 2) enables 5EC6ED BCH logic in the memory controller 114a (block 606). For example, the error correction mode selector 208 can enable 5EC6ED BCH logic in the BCH logic 210 of FIG. 2 to operate in a 5EC6ED BCH per-burst mode.

The memory controller 114a determines whether it has received a write data request (block 608). If a write data request has been received, the BCH logic 210 generates a 5EC6ED BCH code for the data and extension bits to be written (block 610). In the illustrated example, the extension bits are generated by the external extension bit controller 206 of FIG. 2. The memory controller 114a stores the 5EC6ED BCH code in association with the data and extension bits in the memory 112 (block 612). In the illustrated example, the memory controller 114a stores the 5EC6ED BCH code (e.g., the ECC bits 406 of FIG. 4), the data (e.g., the data 402 of FIG. 4), and the extension bits (e.g., the extension bits 404 of FIG. 4) using the example storage arrangement described in connection with the memory device 400 of FIG. 4.

After storing the BCH code, data and extension bits at block 612 or if the memory controller 114a determines at block 608 that it has not received a write data request, the memory controller 114a determines whether it has received a read data request (block 614). If the memory controller 114a has received a read data request, the memory controller 114a reads the requested data from the memory 112 along with the associated extension bits and associated 5EC6ED BCH code (block 616). The 5EC6ED BCH code of the illustrated example protects both the data and the extension bits. In the illustrated example, the memory controller 114a reads the data (e.g., the 64 bytes of data 402 of FIG. 4), the BCH code (e.g., the 51 ECC bits 406 of FIG. 4), and the extension bits (e.g., the eight extension bits 404 of FIG. 4) from a non-tag-specific memory (e.g., the memory device 400 of FIG. 4) within a single read cycle when the external extension bit controller 206 (FIG. 2) determines that the contents of the read memory location are valid.

The BCH logic 210 generates a confirmatory 5EC6ED BCH code based on the read data and extension bits (block 618). In the illustrated example, the BCH logic 210 uses the confirmatory 5EC6ED BCH code to determine whether errors are present in the retrieved data and/or extension bits. For example, a confirmatory 5EC6ED BCH code that does not match a 5EC6ED BCH code stored in association with the retrieved data and extension bits indicates that one or more errors exist in the retrieved data and/or extension bits. The BCH logic 210 compares the confirmatory 5EC6ED BCH code to the 5EC6ED BCH code retrieved at block 616 and determines whether the confirmatory 5EC6ED BCH code matches the retrieved 5EC6ED BCH code (block 620). If the confirmatory 5EC6ED BCH code does not match the retrieved 5EC6ED BCH code, one or more errors are detected in the retrieved data and/or extension bits. In such instances, the BCH logic 210 corrects the detected error(s) in the retrieved data and/or extension bits (block 622). An example process that can be used to implement block 622 is described below in connection with FIG. 7.

After the BCH logic 210 corrects the errors at block 622 or if the BCH logic 210 determines at block 620 that the confirmatory 5EC6ED BCH code does match the retrieved 5EC6ED BCH code, the memory controller 114a returns the requested data or an exception to the requesting processor (e.g., the processor 102 of FIG. 1) (block 624). For example, if no errors are found in the data and/or extension bits retrieved at block 616 or if the BCH logic 210 is able to successfully correct the error(s) at block 622, the memory controller 114a returns the requested data at block 624. Otherwise, if the BCH logic 210 is not able to successfully correct the error(s) found in the data and/or extension bits retrieved at block 616, then the memory controller 114a returns an exception at block 624.

After the memory controller 114a returns the requested data or an exception to the requesting processor at block 624 or if a read data request is not detected at block 614, the memory controller 114a determines whether to end the process (block 626). For example, the memory controller 114a may end the process of FIG. 6A if the memory controller 114a is powered off, shut down, or placed into a standby, sleep, or other low-power mode. If the memory controller 114a determines to not end the process, control returns to block 608. Otherwise, the example process of FIG. 6A ends.

Turning to FIG. 6B, if the tagged mode selector 204 determined at block 602 of FIG. 6A that the system memory mode register 202 does not indicate a tagged mode of operation, the tagged mode selector 204 configures the memory controller 114a to operate in a non-tagged mode (e.g., a normal or conventional mode) (block 628). In addition, the error correction mode selector 208 (FIG. 2) enables 6EC7ED BCH logic in the memory controller 114a (block 630). For example, the error correction mode selector 208 can enable 6EC7ED BCH logic in the BCH logic 210 of FIG. 2 to operate in a 6EC7ED BCH per-burst mode.

The memory controller 114a determines whether any of the SECDED logic 212, the SSCDSD logic 214, or the chipkill logic 216 is enabled (block 632). If the memory controller 114a determines at block 632 that any of the SECDED logic 212, the SSCDSD logic 214, or the chipkill logic 216 is enabled (e.g., one of the logics 212, 214, or 216 was enabled at block 658 of FIG. 6C during a previous iteration of the example process of FIGS. 6B and 6C), control advances to block 660 of FIG. 6C. Otherwise, if none of the SECDED logic 212, the SSCDSD logic 214, or the chipkill logic 216 is enabled (e.g., the 6EC7ED BCH logic in the BCH logic 210 enabled at block 630 is still enabled), control advances to block 634, and the memory controller 114a determines whether it has received a write data request (block 634). If a write data request has been received, the BCH logic 210 generates a 6EC7ED BCH code for the data to be written (block 636). The memory controller 114a stores the 6EC7ED BCH code in association with the data in the memory 112 (block 638).

After storing the BCH code and data at block 638 or if the memory controller 114a determines at block 634 that it has not received a write data request, the memory controller 114a determines whether it has received a read data request (block 640). If a read data request has not been received, control returns to block 634. If the memory controller 114a has received a read data request, the memory controller 114a reads the requested data from the memory 112 along with the associated 6EC7ED BCH code (block 642).

The BCH logic 210 generates a confirmatory 6EC7ED BCH code based on the read data (block 644). In the illustrated example, the BCH logic 210 uses the confirmatory 6EC7ED BCH code to determine whether errors are present in the retrieved data. For example, a confirmatory 6EC7ED BCH code that does not match a 6EC7ED BCH code stored in association with the retrieved data indicates that one or more errors exist in the retrieved data. The BCH logic 210 compares the confirmatory 6EC7ED BCH code to the 6EC7ED BCH code retrieved at block 642 and determines whether the confirmatory 6EC7ED BCH code matches the retrieved 6EC7ED BCH code (block 646). If the confirmatory 6EC7ED BCH code does not match the retrieved 6EC7ED BCH code, one or more errors are detected in the retrieved data. In such instances, the error pattern analyzer 218 determines and logs the error type (block 648) in, for example, the error log 220 (FIG. 2). The BCH logic 210 corrects the detected error(s) in the retrieved data and/or extension bits (block 650).

After the BCH logic 210 corrects the errors at block 650 or if the BCH logic 210 determines at block 646 that the confirmatory 6EC7ED BCH code does match the retrieved 6EC7ED BCH code, the memory controller 114a returns the requested data or an exception to the requesting processor (e.g., the processor 102 of FIG. 1) (block 652). For example, if no errors are found in the data retrieved at block 642 or if the BCH logic 210 is able to successfully correct the error(s) at block 650, the memory controller 114a returns the requested data at block 652. Otherwise, if the BCH logic 210 is not able to successfully correct the error(s) found in the data retrieved at block 642, then the memory controller 114a returns an exception at block 652.

After the memory controller 114a returns the requested data or an exception to the requesting processor at block 652, the error pattern analyzer 218 (FIG. 2) analyzes the logged error types for a pattern or dominant type of error (block 654). The error pattern analyzer 218 determines whether a pattern or dominance of re-occurrence errors exists (block 656). For example, re-occurrence errors are errors that repeatedly occur in the same bit position(s). Such bit positions may be in a region such as a cache line, a page, a rank, or an entire DIMM, and an indicator of the particular region may be stored in the memory controller 114a (e.g., in the error log 220 of the apparatus 116a). If a pattern of re-occurrence errors does not exist in the logged error types or the logged error types do not give an indication of a dominant type of error, then the errors are random. If the error pattern analyzer 218 does not find a pattern of or dominant re-occurrence errors at block 656, then the logged error types are mostly random errors and control returns to block 630.

If the error pattern analyzer 218 does find re-occurrence errors at block 656, the error correction mode selector 208 enables one of the SECDED logic 212, the SSCDSD logic 214, or the chipkill logic 216 of FIG. 2 (block 658) (FIG. 6C). In the illustrated example, if the SECDED logic 212 is enabled, it enables a SECDED per-transfer mode. In the illustrated example, the error correction mode selector 208 determines which of the SECDED logic 212, the SSCDSD logic 214, or the chipkill logic 216 to enable based on the type of information (e.g., data, symbol data, etc.) stored and/or based on the error detection and correction performance that is desired to address the re-occurrence errors. In addition, the error correction mode selector 208 sets a system configuration bit to indicate which of the SECDED mode, the SSCDSD mode, or the chipkill mode is enabled. In such instances, the SECDED logic 212, the SSCDSD logic 214, or the chipkill logic 216 is employed because the SECDED, symbol, and chipkill error detection and correction processes are suitable for handling re-occurrence errors while incurring relatively less latency than the 6EC7ED BCH process. However, the 6EC7ED BCH process is used when random errors are detected because it achieves better error detection and correction performance than the SECDED process for random errors.

After enabling one of the SECDED logic 212, the SSCDSD logic 214, or the chipkill logic 216 at block 658 or after control is advanced from block 632 (FIG. 6B) to block 660, the memory controller 114a determines whether it has received a write data request (block 660). If a write data request has been received, the SECDED logic 212 generates a SECDED code for the data to be written (block 662). The memory controller 114a stores the SECDED code in association with the data in the memory 112 (block 664).

After storing the SECDED code and data at block 664 or if the memory controller 114a determines at block 660 that it has not received a write data request, the memory controller 114a determines whether it has received a read data request (block 666). If a read data request has not been received, control returns to block 660. If the memory controller 114a has received a read data request, the memory controller 114a reads the requested data from the memory 112 along with the associated SECDED code (block 668).

The SECDED logic 212 generates a confirmatory SECDED code based on the read data (block 670). In the illustrated example, the SECDED logic 212 uses the confirmatory SCEDED code to determine whether errors are present in the retrieved data. For example, a confirmatory SECDED code that does not match an SECDED code stored in association with the retrieved data indicates that one or more errors exist in the retrieved data. The SECDED logic 212 compares the confirmatory SECDED code to the SECDED code retrieved at block 668 and determines whether the confirmatory SECDED code matches the retrieved SECDED code (block 672). If the confirmatory SECDED code does not match the retrieved SECDED code, one or more errors are detected in the retrieved data. In such instances, the error pattern analyzer 218 determines and logs the error type (block 674) in, for example, the error log 220 (FIG. 2). The SECDED logic 212 corrects the detected error (s) in the retrieved data and/or extension bits (block 676).

After the SECDED logic 212 corrects the errors at block 676 or if the SECDED logic 212 determines at block 672 that the confirmatory SECDED code does match the retrieved SECDED code, the memory controller 114a returns the requested data or an exception to the requesting processor (e.g., the processor 102 of FIG. 1) (block 678). For example, if no errors are found in the data retrieved at block 668 or if the SECDED logic 212 is able to successfully correct the error(s) at block 676, the memory controller 114a returns the requested data at block 678. Otherwise, if the SECDED logic 212 is not able to successfully correct the error(s) found in the data retrieved at block 668, then the memory controller 114a returns an exception at block 678.

After the memory controller 114a returns the requested data or an exception to the requesting processor at block 678, the memory controller 114a determines whether to end the process (block 680). For example, the memory controller 114a may end the process of FIGS. 6B and 6C if the memory controller 114a is powered off, shut down, or placed into a standby, sleep, or other low-power mode. If the memory controller 114a determines to not end the process, control returns to block 634 of FIG. 6B. Once the memory subsystem (e.g., the memory 112 of FIG. 1) is changed via error isolation or the replacement of a faulty memory device, the error correction mode selector 208 resets the system configuration bit that indicates which of the SECDED mode, the SSCDSD mode, or the chipkill mode. Upon such resetting, the error correction mode selector 208 enables 6EC7ED BCH logic in the BCH logic 210 of FIG. 2 to operate in a 6EC7ED BCH per-burst mode. Otherwise, if the memory controller 114a determines at block 680 to not end the process, the example process of FIGS. 6B and 6C ends.

FIG. 7 is a flow diagram representative of example machine readable instructions to dynamically determine an error correction mode to use in a tagged memory mode. The example process of FIG. 7 is an example staged BCH corrector process in which the memory controller 114a dynamically selects which type of BCH error correction (e.g., fast-ECC, slow-ECC, or slowest-ECC) to use based on the quantities of errors found in data and/or extension bits. The example process of FIG. 7 may be used to implement block 622 of FIG. 6A.

Initially, the error correction mode selector 208 selects a fast error correction code (fast-ECC) and the BCH logic 210 performs a fast-ECC analysis (block 702) on data and extension bits (e.g., the data and extension bits retrieved at block 616 of FIG. 6A). In the illustrated example, the fast-ECC process processes a 5EC6ED BCH code (e.g., the confirmatory 5EC6ED code generated at block 618 of FIG. 6), detects up to six errors but corrects only one bit error without latency penalty. The BCH logic 210 determines whether more than one error is present in the data and/or extension bits (block 704). If more than one error is not present in the data and/or extension bits, the BCH logic 210 uses a fast-ECC error correction process to correct the error (block 706).

If the BCH logic 210 determines that more than one error is present in the data and/or extension bits, the error correction mode selector 208 selects a slow error correction code (slow-ECC) and the BCH logic 210 performs a slow-ECC analysis on the data and extension bits (block 708). The BCH logic 210 determines whether more than three errors are present in the data and/or extension bits (block 710). If more than three errors are not present in the data and/or extension bits, the BCH logic 210 uses a slow-ECC correction process to correct the errors (block 712). In the illustrated example, the slow-ECC process processes the 5EC6ED BCH code (e.g., the confirmatory 5EC6ED code generated at block 618 of FIG. 6) to correct up to three bit errors.

If the BCH logic 210 determines that more than three errors are present in the data and/or extension bits, the error correction mode selector 208 selects a slowest error correction code (slowest-ECC) and the BCH logic 210 performs the slowest-ECC analysis on the data and extension bits (block 714). The BCH logic 210 determines whether more than six errors are present in the data and/or extension bits (block 716). If more than six errors are not present in the data and/or extension bits, the BCH logic 210 uses the slowest-ECC correction process to correct the errors (block 718). In the illustrated example, the slowest-ECC process processes the 5EC6ED BCH code (e.g., the confirmatory 5EC6ED code generated at block 618 of FIG. 6) to correct up to five bit errors per burst.

After correcting the error(s) in the data and/or extension bits at block 718, block 712, or block 706, the BCH logic 210 returns the corrected data and/or extension bits to the memory controller 114a (block 720) so that the memory controller 114a can send the data to a requesting entity such as, for example, the processor 102 of FIG. 1. Otherwise, if the BCH logic 210 determines at block 716 that more than six errors are present in the retrieved data and/or extension bits, the BCH logic 210 returns an exception to the memory controller 114a so that the memory controller 114a can send the exception to a requesting entity such as, for example, the processor 102 of FIG. 1. After returning the data and extension bits or an exception, control returns to a calling function or process such as the example process of FIGS. 6A-6C, and the example process of FIG. 7 ends.

Although the above discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the above describes example methods, apparatus, and articles of manufacture, the examples provided are not the only way to implement such methods, apparatus, and articles of manufacture. Thus, although certain methods, apparatus, and articles of manufacture have been described herein, the scope of coverage of this patent is not limited thereto. To the contrary, this patent covers all methods, apparatus, and articles of manufacture fairly falling within the scope of the claims either literally or under the doctrine of equivalents.

What is claimed is:
1. A method to perform error detection and correction, the method comprising:

dynamically enabling a memory controller, that is operable in both a tagged memory mode and a non-tagged memory mode, to operate exclusively in the tagged memory mode or exclusively in the non-tagged memory mode based on a setting in a system memory mode register of the memory controller;

when the tagged memory mode is enabled in the memory controller, selecting a five-error-correction-six-error-detection per-burst mode to perform error correction on data; and when the non-tagged memory mode is enabled in the memory controller, selecting one of a six-error-correction-seven-error-detection per-burst mode or a single-error-correction-dual-error-detection per-transfer mode based on a pattern of error types in the data.

2. A method as defined in claim 1, further comprising, when the tagged memory mode is enabled in the memory controller, retrieving a number of bytes of data, a number of bits of an error correction code, and extension bits corresponding to a tagged extended double word from a non-tag-specific memory into the memory controller within a single read cycle.

3. A method as defined in claim 1, further comprising, when the tagged memory mode is enabled in the memory controller:
using a fast error correction code process to correct an error when the memory controller detects one error in the data or extension bits;
using a slow error correction code process to correct errors when the memory controller detects two or three errors in the data or the extension bits; and
using a slowest error correction code process to correct errors when the memory controller detects more than three errors in the data or the extension bits.

4. A method as defined in claim 1, further comprising, when the tagged memory mode is enabled in the memory controller, using a first portion of bits reserved for an error correction code to store extension bits for tagged memory words, and using a second portion of the bits reserved for the error correction code to store the error correction code.

5. A method as defined in claim 4, wherein the first portion of the bits reserved for the error correction code includes eight bits corresponding to sixty-four-bit words, and wherein the second portion of the bits reserved for the error correction code includes fifty-one bits corresponding to the sixty-four-bit words.

6. An apparatus to perform error detection and correction, the apparatus comprising:
a tagged mode selector to dynamically enable a memory controller to operate in a tagged memory mode based on a first setting in a system memory mode register of the memory controller, and to dynamically enable the memory controller to operate in the non-tagged memory mode based on a second setting in a system memory mode register of the memory controller; and
an error correction mode selector to:
select a fast error correction code process to correct an error when the memory controller detects one error in data or extension bits;
select a slow error correction code process to correct errors when the memory controller detects two or three errors in the data or the extension bits;
select a slowest error correction code process to correct errors when the memory controller detects more than three errors in the data or the extension bits; and
select one of a six-error-correction-seven-error-detection per-burst mode or a single-error-correction-dual-error-detection per-transfer mode based on error types in the data when the tagged mode selector enables a non-tagged memory mode in the memory controller.

7. An apparatus as defined in claim 6, wherein the error correction mode selector is to select a five-error-correction-six-error-detection per-burst mode to perform error correction on the data or the extension bits.

8. An apparatus as defined in claim 6, further comprising logic to perform a fast error correction code process, a slow error correction code process, or a slowest error correction code process on the data and the extension bits retrieved from a non-tag-specific memory.

9. A non-transitory machine accessible storage medium comprising instructions that, when executed, cause a machine to at least:
enable a memory controller to operate in one of a tagged memory mode or a non-tagged memory mode;
when the tagged memory mode is enabled in the memory controller, select a five-error-correction-six-error-detection mode to perform error correction on data or extension bits; and
when the non-tagged memory mode is enabled in the memory controller, select, based on a pattern of previously detected error types in previous data or previous extension bits, one of a six-error-correction-seven-error-detection mode or a single-error-correction-dual-error-detection mode.

10. A non-transitory machine accessible storage medium as defined in claim 9, wherein the instructions cause the memory controller to operate in one of the tagged memory mode or the non-tagged memory mode based on a setting in a system memory mode register of the memory controller.

11. A non-transitory machine accessible storage medium as defined in claim 9, wherein the instructions further cause the machine to, when the tagged memory mode is enabled in the memory controller, use a first portion of bits reserved for an error correction code to store extension bits for tagged memory words, and use a second portion of the bits reserved for the error correction code to store a number of error correction code bits corresponding to the tagged memory words.

12. A non-transitory machine accessible storage medium as defined in claim 11, wherein the instructions further cause the machine to:
use a fast error correction code process to correct an error when the memory controller detects one error in the data or extension bits;
use a slow error correction code process to correct errors when the memory controller detects two or three errors in the data or the extension bits; and
use a slowest error correction code process to correct errors when the memory controller detects more than three errors in the data or the extension bits.

* * * * *